United States Patent [19]

Fischer

[11] 4,050,346
[45] Sept. 27, 1977

[54] ANCHORING DEVICE FOR USE IN MASONRY AND LIKE STRUCTURES WITH CORROSION-PROTECTION FEATURE

[76] Inventor: Artur Fischer, Weinhalde 34, D-7244 Tumlingen, Waldachtal 3, Germany

[21] Appl. No.: 702,859

[22] Filed: July 6, 1976

[30] Foreign Application Priority Data

July 8, 1975 Germany .................. 2530361

[51] Int. Cl.² .................................. F16B 13/06
[52] U.S. Cl. .................................. 85/69; 52/378; 85/1.5 R; 85/84
[58] Field of Search .................. 85/64, 67, 69, 82, 83, 85/84, 85, 1.5 R, 1 C, 73; 52/373, 378, 383, 506, 509, 512

[56] References Cited

U.S. PATENT DOCUMENTS

| 2,633,735 | 4/1953 | Dondero | 52/378 |
|---|---|---|---|
| 2,936,015 | 5/1960 | Rapata | 85/1.5 R |
| 3,256,661 | 6/1966 | Fischer | 85/83 |
| 3,471,183 | 10/1969 | Fischer | 85/84 |
| 3,662,644 | 5/1972 | Flesch | 85/69 |

FOREIGN PATENT DOCUMENTS

| 737,206 | 6/1966 | Canada | 85/82 |
|---|---|---|---|
| 756,831 | 4/1967 | Canada | 85/84 |
| 1,274,326 | 8/1968 | Germany | 52/378 |
| 711,711 | 7/1966 | Italy | 85/67 |
| 483,533 | 2/1970 | Switzerland | 85/84 |

*Primary Examiner*—Marion Parsons, Jr.
*Attorney, Agent, or Firm*—Michael J. Striker

[57] ABSTRACT

A first element is adapted to be received and anchored in a hole of a structure; and a second element has a first portion located in the hole and secured in the first element, and a second elongated portion which extends outwardly from the hole. An adjustable element is mounted on the second portion for movement in direction of the elongation of the latter and is operative to position an object on the second portion at any of a plurality of distances from the structure. In order to protect the first and second elements from corrosion, an axially yieldable protective sleeve which surrounds the aforementioned second portion intermediate the structure and the object is provided with a tubular end section which sealingly engages a tubular extension section which is provided on the adjustable element. At least one of these sections overlaps the other and thereby provides mutual sealing contact at any of the distances which has been selected for the object.

13 Claims, 1 Drawing Figure

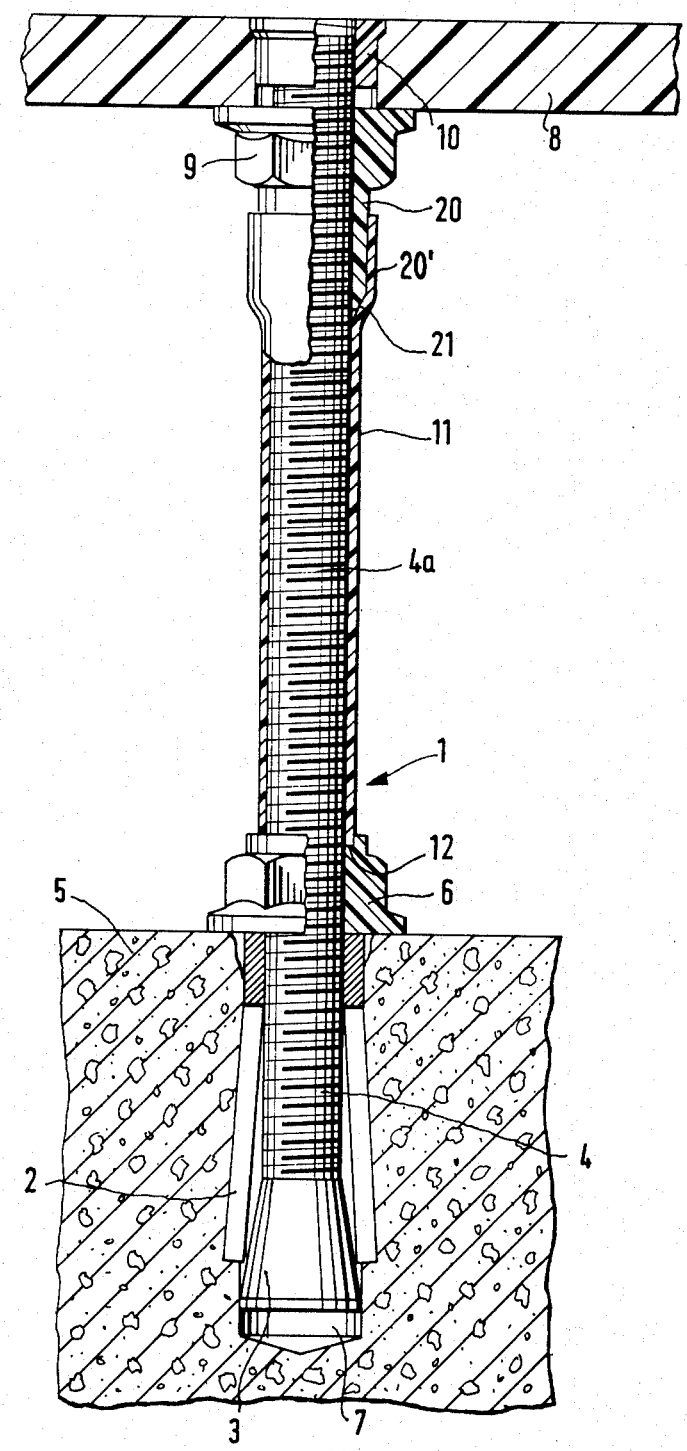

ANCHORING DEVICE FOR USE IN MASONRY AND LIKE STRUCTURES WITH CORROSION-PROTECTION FEATURE

BACKGROUND OF THE INVENTION

The present invention relates generally to an anchoring device and, more particularly, to an anchoring device for use in mounting objects at a distance from masonry and like supporting structures.

Anchoring devices are used for anchoring in masonry structures or other structures, wherein a portion of the device — usually a portion of a screw or bolt — extends outwardly of a hole formed in the structure for anchoring purposes, and carries at some spacing from the exterior surface of the structure an object, such as a cladding panel or the like. The trouble with these anchoring arrangements is that at least the portion which extends beyond the masonry or other supporting structure, i.e. the portion which is located between the supporting structure and the cladding panel, is exposed to the sometimes deleterious ambient conditions, such as moisture, corrosive gas in the atmosphere, or the like which may cause destruction of this portion due to corrosion.

It is known to make at least the portions which are so exposed of material that is resistant to corrosion, such as specialty steels. However, these steels are much more expensive than the materials that are normally used for this purpose, and it is also much more difficult to work with them; as a result, the use of such specialty materials would substantially increase the manufacturing and selling expenses of these anchoring devices.

It is, however, important that these devices be available as inexpensively as possible, because they are used in large quantities, so that increases in the manufacturing and selling costs of such devices can represent substantial additions to the expenses involved in a construction project, renovation project or the like.

It is also known to employ an axially yieldable protective sleeve which surrounds the aforementioned portion of the device which extends beyond the structure. The sleeve is located between the support structure and the object to be carried. Thereupon, by slightly axially compressing the sleeve between the object and the support structure, the opposite ends of such a sleeve will engage the object and the support structure respectively in order to make sealing contact therewith.

However, this prior-art device is disadvantageous when one wishes to thereafter readjust and change the distance at which the object is to be positioned relative to the structure. For example, if one increases this distance after the protective sleeve has already been positioned beyond the stretching limits of the sleeve, then the opposite ends of the sleeve will no longer sealingly engage the structure and/or the object. This means that all parts of the anchoring device are no longer protected from the ambient corrosion-producing media.

SUMMARY OF THE INVENTION

Accordingly, it is an object of the present invention to provide an improved anchoring device of the type in question which avoids the aforementioned disadvantages.

More particularly, it is an object of the present invention to provide such an improved anchoring device which is reliably protected against corrosion resulting for the reasons mentioned above, without having to utilize specialty materials.

Another object of the invention is to provide such an anchoring device which is inexpensive to produce despite the improved protection which it affords.

An additional object of the present invention is to assure corrosion protection even after the distance at which an object is positioned relative to a supporting structure is increased.

In keeping with these objects and others which will become apparent hereinafter, one feature of the invention resides in an anchoring device for use in mounting an object to a supporting structure, such as masonry, which, briefly stated, comprises a first element adapted to be received and anchored in a hole of a structure, and a second element having a first portion located in this hole and secured in the first element, and a second elongated portion extending outwardly from the hole. An adjustable element is mounted on the second portion for movement in direction of the elongation of the latter and is thereby operative for positioning an object to be mounted at any of a plurality of distances relative to the structure. In order to prevent access of corrosion-producing media to the first and second elements at any of these distances, an axially-extendable, yieldable protective sleeve surrounds the aforementioned second portion intermediate the structure and the object. The protective sleeve is provided with a longitudinally-extending tubular end section which sealingly engages a tubular extension section which extends from the adjustable element in direction towards the first element. At least one of these tubular sections, i.e. either the tubular extension section or the tubular end section, overlaps the other of said sections so as to provide sealing contact with the latter at any selected distance determined by the adjustable element.

Such a device is first anchored in the supporting structure, that is the masonry wall of the like, and the protective sleeve which is axially yieldable is then placed around the second portion which projects out from the hole in the support structure. Thus, the protective sleeve is located between the support structure and the cladding panel or other object which is to be carried at a distance from the support structure. The sleeve has an axial uncompressed length which is preferably longer than that of the length of said second portion. The sleeve is thereupon slightly axially compressed by virtue of the axial movement of the adjustable element. At least one of the tubular sections, preferably the tubular end section of the sleeve, overlaps the other of the sections and thereby insures mutual sealing contact at any of the distances selected for the object.

This overlapping feature of the present invention assures that sealing contact will be effective over long periods of time and over a predetermined range of distances relative to the support structure.

According to another feature of the present invention, the tubular extension section of the adjustable element has a tapered leading end which is formed with a free tip which is received within the interior of the tubular end section. This leading end is tapered so as to converge in direction towards the tip. This feature facilitates entry of the tubular extension section into the tubular end section.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE is a sectional view, illustrating an embodiment of the invention.

DESCRIPTION OF A PREFERRED EMBODIMENT

The FIGURE shows by way of example an embodiment of the invention. The device in toto is identified with reference numeral 1 and utilizes an expansion anchor sleeve member 2 which here is in form of a cylindrical member having expandable leg portions. Alternatively, the sleeve member 2 may be a block spring composed of a plurality of wire convolutions. Located at the trailing end of the sleeve 2, that is the end which is last to be inserted into the hole 7 formed in the supporting structure 5, the sleeve 2 is formed with a central tapped bore into which a threaded portion of a screw or bolt 4, constituting an expander member, can be introduced so as to mesh with the screw threads therein. The member 3 has a conical portion which extends into and expands the sleeve 2 when the screw 4 is turned in requisite sense. The sleeve 2 is expanded until the leg portions are in anchoring engagement with the material surrounding the hole 7.

An abutment member or corrosion-resistant nut 6 threadedly engages the screw 4 and abuts against the exterior surface of structure 5. The nut 6 has a diameter which is greater than that of the hole 7 and thereby reliably prevents the entry of corrosion-producing media into the hole, where such media might damage those parts of the device which are located within the hole. Furthermore, the abutment of the nut 6 against the exterior surface of the structure 5 assures that the material of the structure which surrounds the hole opening is less subject to crumbling and breaking away. Any corrosion-resistant material may be used to make the nut 6, and preferably synthetic plastic material or any acid- and corrosion-resistant steel such as X12CRNI188 or X5CRNIMO1810 may be employed.

As described so far, the screw 4 has a first portion located in the hole 7 and secured therein, and a second portion identified by reference numeral 4a which is elongated and which extends outwardly from the hole. It is this second portion 4a which carries the object 8, such as a cladding panel or plate, at a distance from the structure 5. In order to position the object 8 at any one of a plurality of distances from the structure 5, an adjustable element or nut 9 engages one side of the object and is mounted on the second portion 4a for movement in direction of the elongation of the latter. As shown in the drawing, the nut 9 has a tapped bore which receives and meshes with the threads of the second portion 4a.

To provide the desired corrosion protection at any of the aforementioned distances, a protective sleeve 11 is provided which is placed about the second portion 4a before the cladding panel 8 is put in place. The sleeve 11 is circumferentially complete and is formed of relatively thin-walled corrosion-resistant material. Furthermore, the protective sleeve is composed of resilient material which is axially yieldable in response to the axial movement of the adjustable element 9 on the second portion 4a.

The sleeve 11 has a tubular end section 20' at its upper region which sealingly engages a tubular extension section 20 which extends from and is preferably integral with the adjustable element 9 in direction towards the structure 5. The tubular end section may either overlap the extension section 20, as illustrated, or the tubular end section of the protective sleeve may be located underneath the extension section 20. In either event, mutual sealing contact between these two tubular sections is provided in this overlapping region no matter what distance may be selected by the adjustable element.

The length of the tubular extension section 20 is preferably chosen to conform to the eventual desired range of readjustment of the position of the object 8 relative to the structure 5. It will be understood that the length of the overlapping region may be chosen as desired, since it directly limits the total range of possible distances at which the object may be located.

The opposite tubular end section of the sleeve 11 which is provided at its lower region is received in sealing relationship with an annular recess 12 which is formed in the abutment member 6. This insures a tight seal in the area adjacent the hole opening.

Finally, in order to reliably seal the upper portion of the anchoring device from corrosion-producing media, a locking element 10 of corrosion-resistant material is provided with a tapped bore which meshes with the second portion 4a. The locking element 10 is provided at the side of the object which is opposite to the side at which the adjustable element is located, and is preferably countersunk into the object 8.

In order to facilitate entry of the tubular extension section 20 into the upper tubular end section of the protective sleeve, the tubular extension section 20 is formed with a tapered leading end. This leading end is tapered so as to converge in direction towards the free tip of the extension section. By virtue of the elasticity of the protective sleeve, close contact between the tubular sections is guaranteed.

All parts of the device according to the present invention requiring to be protected, for example members 2, 3, 4 and 4a may be made of inexpensive metals, and certainly are not required to be made of metals which have any particular resistance to corrosion due to moisture, chemical influence or the like. The sleeve 11 may be made of any suitable synthetic plastic material, for example polyethylene, polyvinyl chloride, or any of the other synthetic plastic materials or even natural rubber that are known in the art and have the necessary characteristics. The sleeve 11 could also be made of synthetic plastic foam material, as long as the foam is of such type as to prevent the migration of deleterious media through it, that is of the closed-cell type or else of the open-cell type which is provided at the exterior and/or the interior of the sleeve 11 with a non-porous skin.

The abutment member 6, the adjustable element 9 including its extension section 20, or the locking element 10 may similarly be formed of any suitable synthetic plastic material. If desired, these elements may also be formed of any acid- and corrosion-resistant steel.

It will be understood that each of the elements described above, or two or more together, may also find a useful application in other types of constructions differing from the types described above.

While the invention has been illustrated and described as embodied in an anchoring device for use in masonry and like structures with corrosion-protection feature, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An anchoring device for use in mounting an object to a supporting structure, comprising a first element adapted to be received and anchored in a hole of a structure; a second element having a first portion located in said hole and secured in said first element, and a second elongated portion extending outwardly from said hole; means for positioning an object to be mounted at any of a plurality of distances from the structure, comprising an adjustable element in engagement with the object and being mounted on said second portion for movement in direction of the elongation of the latter; means for preventing access of corrosion-producing media to said first and second elements at any of said distances, said preventing means comprising a protective sleeve surrounding said second portion intermediate the structure and the object and having a longitudinally-extending tubular end section, and a tubular extension section extending from said adjustable element in direction towards said first element and sealingly engaging said tubular end section, at least one of said tubular sections overlapping the other of said sections so as to provide sealing contact with the latter at any selected distance determined by said adjustable element; and an abutment member mounted on said second portion and engaging the structure in the region of the hole opening, said abutment member being formed with an annular recess for receiving another tubular end section of said protective sleeve in sealing relationship.

2. An anchoring device for use in mounting an object to a supporting structure, comprising a first element adapted to be received and anchored in a hole of a structure; a second element having a first portion located in said hole and secured in said first element, and a second elongated portion extending outwardly from said hole; means for positioning an object to be mounted at any of a plurality of distances from the structure, comprising an adjustable element in engagement with the object and being mounted on said second portion for movement in direction of the elongation of the latter; and means for preventing access to corrosion-producing media to said first and second elements at any of said distances, said preventing means comprising a protective sleeve surrounding said second portion intermediate the structure and the object and having a longitudinally-extending tubular end section, and a tubular extension section extending from said adjustable element in direction towards said first element and sealingly engaging said tubular end section, at least one of said tubular sections overlapping the other of said sections and sealingly contacting said other section about the entire periphery of the latter at any selected distance determined by said adjustable element.

3. The anchoring device as defined in claim 2, wherein said tubular sections have cylindrical configurations, and wherein said one cylindrical section overlaps said other cylindrical section over a predetermined length, and thereby sealingly contacts said other cylindrical section over said entire predetermined length.

4. The anchoring device as defined in claim 2, wherein said first element includes an expansion sleeve member, and an expander member adapted to be drawn into said expansion sleeve member by said second element.

5. The anchoring device as defined in claim 2, wherein said second elongated portion has an exterior thread, and wherein said adjustable element has a tapped bore which receives and meshes with the thread of said second portion.

6. The anchoring device as defined in claim 2, wherein said protective sleeve is composed of resilient material and is axially yieldable in response to axial movement of said adjustable element on said second portion.

7. The anchoring device as defined in claim 1, wherein said protective sleeve is circumferentially complete and is formed of relatively thin-walled corrosion-resistant material.

8. The anchoring device as defined in claim 2, wherein said tubular end section of said protective sleeve overlaps said tubular extension section of said adjustable element.

9. The anchoring device as defined in claim 8, wherein said tubular extension section has a tapered leading end formed with a free tip which is received within the interior of said tubular end section, said leading end converging in direction towards said tip so as to facilitate entry of said tubular extension section into said tubular end section.

10. The anchoring device as defined in claim 2, and further comprising an abutment member mounted on said second portion and engaging the structure in the region of the hole opening, said abutment member being formed with an annular recess which receives in sealing relationship the other tubular end section of said protective sleeve.

11. The anchoring device as defined in claim 2, and further comprising an abutment member mounted on said second portion so as to be axially spaced from said adjustable element; and wherein said abutment member, said protective sleeve and said adjustable element are all composed of corrosion-resistant material.

12. The anchoring device as defined in claim 2, wherein said adjustable element engages one side of the object to be mounted; and further comprising a locking element which engages the other side of the object for fixing the object in place at a distance from the structure.

13. An anchoring device for use in mounting an object to a supporting structure, comprising a first element adapted to be received and anchored in a hole of a structure; a second element having a first portion located in said hole and secured in said first element, and a second elongated portion extending outwardly from said hole; means for positioning an object to be mounted at any of a plurality of distances from the structure, comprising an adjustable element in engagement with the object and being mounted on said second portion for movement in direction of the elongation of the latter; and means for preventing access of corrosion-producing media to said first and second elements at any of said distances, said preventing means comprising a protective sleeve surrounding said second portion intermediate the structure and the object and having a longitudinally-extending tubular end section, and a tubular extension section extending from said adjustable element in direction towards said first element and sealingly engaging said tubular end section, said tubular end section overlapping said tubular extension section so as to provide sealing contact with the latter at any selected distance determined by said adjustable element, and said tubular extension section also having a tapered leading end formed with a free tip which is received within the interior of said tubular end section, said leading end coverging in direction towards said tip so as to facilitate entry of said tubular extension section into said tubular end section.

* * * * *